Jan. 2, 1968   M. F. INMAN   3,361,091
DEVICE FOR HOLDING LAP-USED ARTICLES
Filed May 25, 1967   3 Sheets-Sheet 1
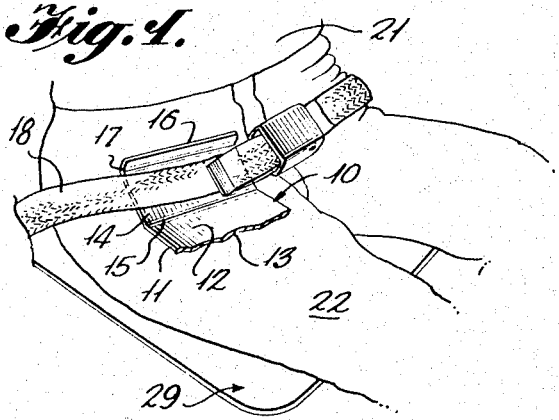
Fig. 1.
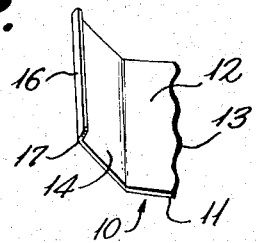
Fig. 2.
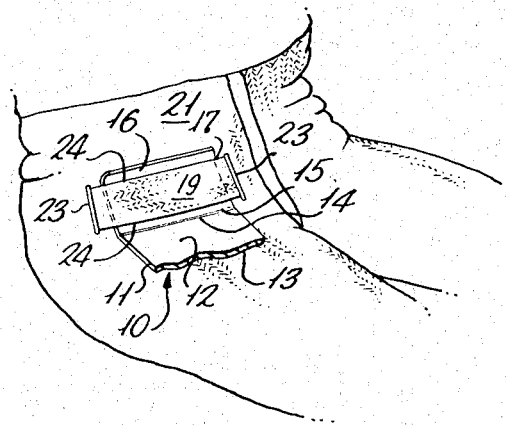
Fig. 3.
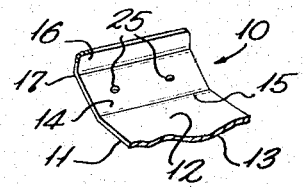
Fig. 4.
Fig. 5.
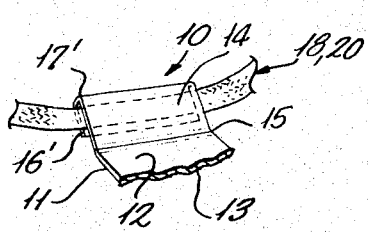
Fig. 6.
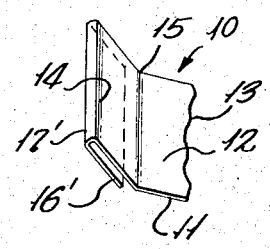
Fig. 7.
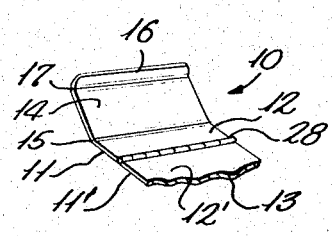
Fig. 8.
INVENTOR
Murray F. Inman
BY Max Warren Cook
ATTORNEY

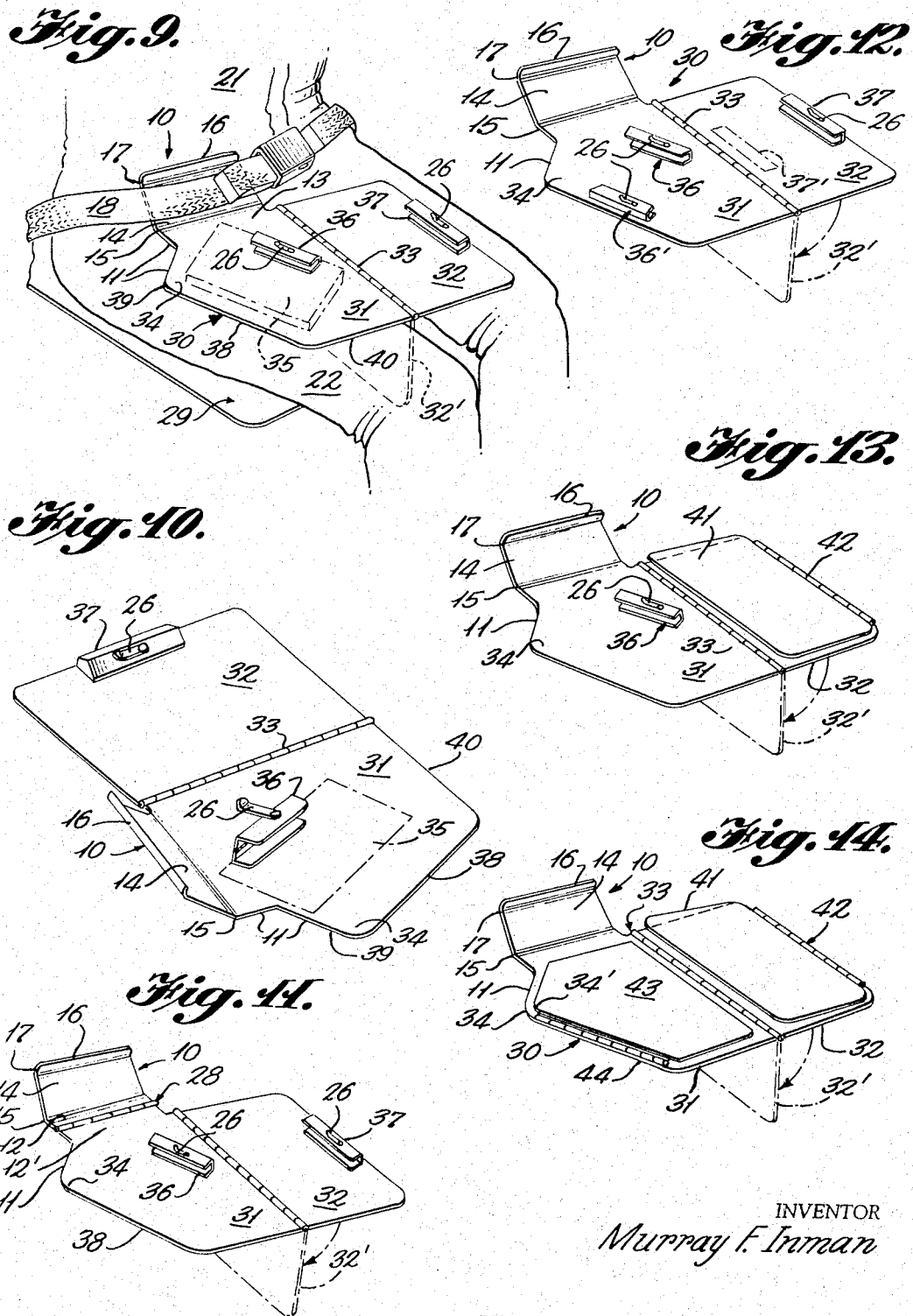

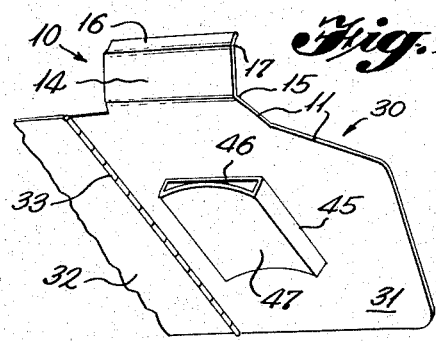
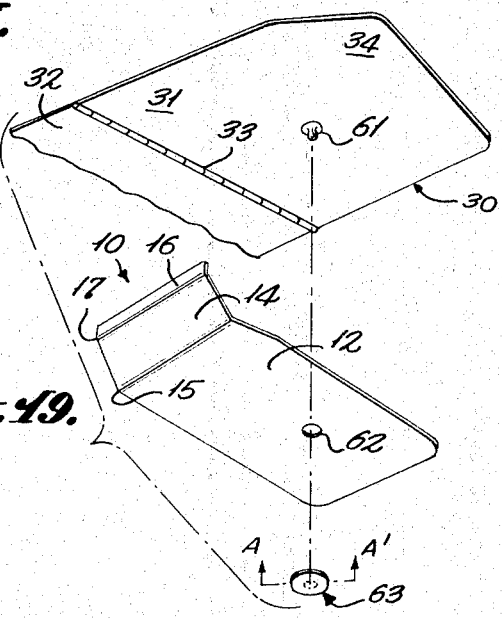
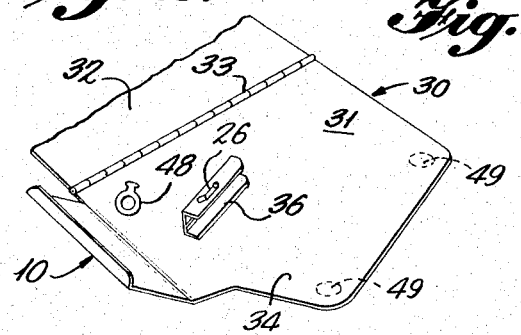
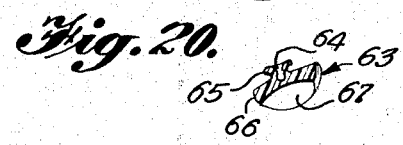
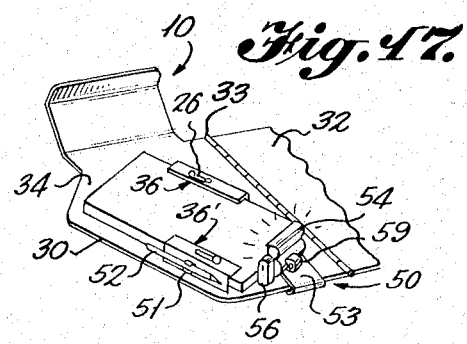
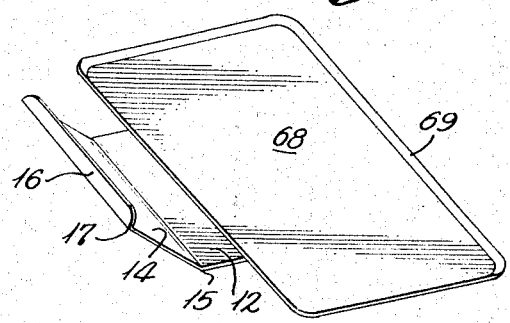
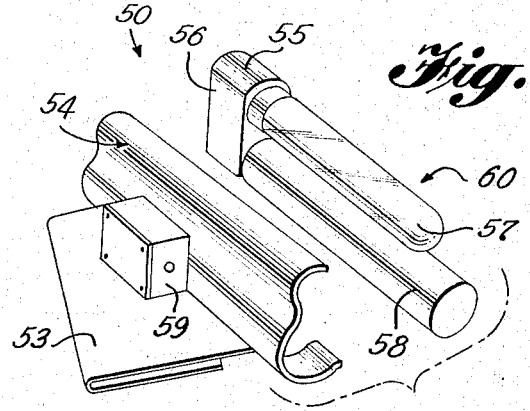

though not exclusively by, any pilot, operator or occupant of any land, sea or air craft, while in either a sitting, near sitting or reclining position. This device is an appropriately shaped and contoured piece of suitable strip material which may be inserted under, in or attached to and held and secured in position by either the user's belt, seat belt, safety belt or wearing apparel as desired. The device holds and secures any particular lap-used article that is attached thereto, or which it forms an integral part thereof, in the most convenient position for use.

In particular, it is the object of this invention to provide a long sought after and much needed inexpensive, simple, lightweight means to readily and easily hold and secure any lap-used article in its most convenient position for use by a person in either a sitting, near sitting or reclining position. In the past, this has been variously attempted, but only with a limited success and satisfaction. The principal means used heretofore to hold lap-used articles in a position for use has been by using straps attached to the user's leg. This has not proven to be wholly satisfactory or desirable, since this means causes the user discomfort and causes an excessive wrinkling of clothing, besides restricting body movement and interfering with the free blood circulation. In particular, this is an impractical means for female users to use when wearing an ordinary dress. Furthermore, strapping of the lap-used article to the user's leg creates a safety hazard for the user, particularly in situations where it is desirable to quickly detach or disassociate the lap-used article from the user, especially in those emergency situations involving airplane and rocket pilots and automobile operators. Strapping of a lap-used article to the user's leg is neither convenient nor readily done, particularly where the user is endeavoring to attach same in confined quarters. Such a strap attachment further creates the safety hazard where there exists the possibility that the strap will be caught by some other object and create a danger to the user.

It is, therefore, the object of this invention to provide a simple, inexpensive, lightweight means of holding and securing lap-used articles in their most convenient position of optimum use, which is at the same time safe for the user to use and which may be quickly and conveniently attachable and detachable as the occasion requires. It is further the object of this invention to provide a means of holding lap-used articles in such a position that they may be comfortably used over a prolonged period without undue fatigue to the user. Still another object of this invention is to provide a simple means for holding and securing, either rigidly, flexibly or pivotally, lap-used articles in their most convenient position of optimum use without causing the user to contort, twist or skew in order to use the article. It is still further the object of this invention to provide a simple means of holding and securing lap-used articles so that such articles can be conveniently and practically used by both male and female users equally even when the female user is wearing an ordinary dress.

Another object of this invention is to provide a means for holding and securing a lap-used article which permits the user to quickly detach or disassociate the article from the user whenever desired with minimum effort, particularly in emergencies and in situations where time is of the essence. It is still another object of this invention to provide a means of holding and securing lap-used articles in a manner that does not create a safety hazard to the user. Yet another object of this invention is to provide a means which is adaptable for and which may be used for holding a variety of lap-used articles, such as, but not limited to, clipboards, lapboards, trays, mapholders, displays, check-off lists, sheet material, instruments, tools, weapons, kits and many other lap-used articles too numerous to mention.

It is also the object of the invention to provide a device for holding a lapboard which can be used to hold and display a variety of items, such as, but not limited to, maps, charts, sheet material, forms, lists, photographs and many other items for reading, observation or writing upon too numerous to mention here. It is the object to provide a lapboard that air, land or marine craft operators, or occupants can comfortably use with natural effort without having to twist, skew or contort. It is still a further object of the invention to provide an inexpensive, lightweight, rugged lapboard, anti-magnetic if desired, that is safe for the user to use with the feature that it can be quickly positioned for use or be quickly released from use and be readily and handily stowed away with minimum effort in a minimum of space. Another object of the invention is to provide a lapboard which is quickly usable or disassociatable which any pilot, operator or occupant of any air, land or marine craft can use to quickly secure and releaseably hold sheet material such as maps, charts and other items in their most convenient position for use and observation. Still another objective is to provide a lapboard which any pilot, operator or occupant of any air, land or marine craft can use to quickly and releaseably hold any sheet material for use and observation in such a manner that it will not be blown away or disturbed by the wind, while at the same time eliminating the need for hand holding, which frees the hands for other uses.

Yet another objective is to provide a lapboard with an inexpensive, lightweight, rugged, detachable combination lamp and pencil sharpener constructed to be convenient and reliable in use.

A further objective is to provide a means for holding lap-used articles which may be either permanently attached to and incorporated as a part of such article or be detachably attached to such an article.

Still yet a further object of the invention is to provide a means for holding an ordinary tray or conventional server either as a part thereof or an attachment thereto, which any operator or occupant of any land, sea or air craft can use for, but not exclusively for, the serving of food and drink to the user, such as for example in commercial airplanes or in vehicles at drive-in restaurants.

These and still other objects, advantages and uses will become apparent from the accompanying drawings and the following description.

The drawing presented which shows the invention is briefly described as follows:

FIG. 1 is a perspective view of the subject device for holding lap-used articles illustrating one application of the invention in use.

FIG. 2 is an angular perspective view of the FIG. 1 device.

FIG. 3 is a perspective view of the subject device illustrating another application of the invention in use.

FIG. 4 is a perspective view of the subject device featuring snaps for attaching same into mating snaps on the user's wearing apparel.

FIG. 5 is a perspective view of the subject device illustrating yet another application of the invention adapted to be held and secured by a belt slipped-through appropriately provided cut-outs.

FIG. 6 is a perspective view of the subject device illustrating still another application which utilizes a clip means of attachment to attach the device to the user's wearing apparel.

FIG. 7 is a side perspective view of the FIG. 6 device.

FIG. 8 is a perspective view of the subject device showing a hingeable means for attaching the device to a lap-used article.

FIG. 9 is a perspective view of a lapboard incorporating the subject device as a part thereof.

FIG. 10 is an angular perspective view of the FIG. 9 illustrating the lapboard and subject device.

FIG. 11 is a perspective view of the FIG. 9 lapboard featuring hingeable means for attaching the subject device thereto.

FIG. 12 is a perspective of the FIG. 9 lapboard featuring multiple spring clip means on the lapboard to secure sheet material.

FIG. 13 is a perspective view of the FIG. 9 lapboard featuring a spring hingeable, transparent panel.

FIG. 14 is a perspective view of the FIG. 9 lapboard featuring multiple spring hingeable, transparent retainer panels.

FIG. 15 is a perspective underneath view of any of the FIGS. 9–14 lapboards with contoured underneath leg rest.

FIG. 16 is a perspective view of any of the FIGS. 9–14 lapboards with stop-watch attached thereto.

FIG. 17 is a perspective view of any of the FIGS. 9–14 lapboards featuring auxiliary detachable combination lamp and pencil shapener.

FIG. 18 is a perspective view of the detachable combination lamp and pencil sharpener of FIG. 17 showing the spring clip retainer means for holding the lamp, the pencil sharpener mounted on the back of said spring clip retainer means and spring clip for detachably attaching the lamp and pencil sharpener to an item such as a lapboard.

FIG. 19 is an exploded perspective view of the lapboard showing the lapboard pivotally mounted.

FIG. 20 is a cross-sectional perspective view along line A–A' of FIG. 19 of the pivot retainer cap.

FIG. 21 is a perspective view of subject device incorporated as a part of a tray.

The invention and the various adaptations thereof will be better understood from the following description.

The invention consists of a device or means 10 for holding lap-used articles, as generally shown in FIGS. 1 and 2. This consists of a fabricated, molded, pressed, shaped or otherwise formed sheet 11 of suitably rigid material, such as, but not restricted to steel, aluminum, magnesium, plastic, pressboard or other substantially rigid sheet material. It has been found, for example, that aluminum, plastic or other material with similar characteristics is best suited for the device, especially when it is to be used in an airplane or other area where lightness of weight and anti-magnetic characteristics are desired. Sheet 11 may obviously be shaped as best suited for the particular intended purpose or application. It has been further found that the shape as generally described herein is best suited for most applications.

Sheet 11 has three general portions 12, 14 and 16 as shown in FIGS. 1 and 2. The first portion, or main lap section, 12 is designed so that it will lay flat on the user's lap 22, or top of his leg, when the user 21 is in either a sitting, near sitting or reclining position, as illustrated in FIG. 1. End 13 of this main lap section 12 is designed so that it may either be attached to or incorporated as an integral part of the particular lap-used article with which it is being used. It has been found preferable to design device 10 so that it is angularly displaced in use and attachment by approximately 10 to 20 degrees from the line of main use of the particular lap-used article to which it is attached or incorporated, as is generally shown in FIGS. 9–21. This permits the particular lap-used article to be held or skewed on the user's lap at a more natural angle for its most convenient and effective use.

The second portion 14 of sheet 11 is formed, shaped, bent or molded at an upward angle relative to the plane of the main lap section 12. It is further designed so as to be held and secured by either the user's belt, as is generally shown by 18 in FIG. 1, or by a band or belted section or other portion 19 of the user's wearing apparel, as generally shown in FIG. 3, or by a separate belt or strap 18, 20 slipped-through, attached to or positioned over it, as generally shown in FIG. 5, or by a clip means 16, as generally shown in FIGS. 6 and 7, clipped over or secured to the user's belt, safety belt or wearing apparel. It has been found, for example in the application shown in FIG. 1, that the plane of second portion 14 should be positioned at an upward angle of approximately 120 degrees from the plane of the main lap section 12 in order to be best suited and most comfortable for a pilot, operator or occupant of any land, sea or air craft, especially when a safety belt is used as the means for holding and securing the said device. However, it is obvious that the angular position of portion 14 relative to the main lap section 12 can be varied as desired to best suit particular purposes or applications.

The third portion 16 of sheet 11 is formed, shaped, bent or molded outwardly at an angle 17 away from the user as generally shown in FIG. 1 et seq. This third portion 16 is designed so that it generally overlaps or overhangs the top of the belt or other means securing and holding the second portion 14, as generally shown in FIG. 1. This assists in preventing the second portion 14 from slipping from beneath the means holding and securing it, as well as assists in properly positioning 14. I have found, for example in the application shown in FIG. 1 that the angle 17 should preferably be approximately 150 degrees relative to the second portion 14. By having section 16 bent outwardly and away from the user's body it has been further found that this makes the device more comfortable and safe for a pilot, operator or occupant of any land, sea or air craft to use when in a sitting, near sitting or reclining position. For example this eliminates any sharp edge that would injure the user if any blow propelled the subject device back into the user. However, it is obvious that angle 17 may be varied as desired to best suit particular purpose or application.

A seat or means of supporting the user 21 is generally shown in FIG. 1 as 29. The user 21 thus may be supported as desired in either a sitting, near sitting or reclining position.

FIG. 3 shows another adaptation for holding and securing device 10 by means of banded portion 19, or other part, of the user's wearing apparel. The portion of the user's wearing apparel holding device 10 may be reinforced as desired to prevent tearing or damage of the fabric as generally shown by 23. It is obvious that band 19 can be made by appropriately providing slits 24 wherever desired in the user's wearing apparel through which portion 14 and 16 of the device can be slipped to hold and secure device 10 in position for use. It is further obvious that other ways of using the wearing apparel of the user to hold and secure device 10 may be used.

FIG. 4 shows yet another adaptation for holding and securing device 10. This incorporates conventional snaps 25 in portion 14 to snap into mating snaps attached either to the user's wearing apparel, belt, or safety belt or other means. It is obvious that common buttons can also be used in place of said snaps as a means of holding and securing device 10 to the user. It is further obvious that a zipper means can also be used to secure or attach device 10 to the user's wearing apparel, belt, safety belt or other means.

FIG. 5 shows yet another adaptation of holding and securing device 10 using a separate belt or strap means 20, which is either attached to or is interwoven through or is secured over portion 14 of device 10. It is obvious that such a belt or strap means 20 can be either the user's belt, safety belt or banded portion of user's wearing apparel. In the particular adaptation shown in FIG. 5, two substantially vertical, separated slits or perforations 27 are made through portion 14 through which is threaded or woven the belt or strap means 20. Preferably the slits or perforations 27 have rounded edges to prevent excessive wearing of the belt or strap means 20 and for safety.

Still another adaptation of holding and securing device 10 uses a clip means 16' as generally shown in FIGS. 6 and 7. In this particular adaptation instead of the third portion 16 being outwardly bent as shown in FIGS. 1 through 5 this portion is elongated and is reversibly bent, shaped, formed or molded at 17' inwardly and back and under the second portion 14 leaving a clearance space therebetween so as to form a spring clip which the user may clip over his belt or safety belt or portion of his wearing apparel to hold and secure device 10 thereto.

Another adaptation of device 10 uses a hingeable means 28 interposed in the main lap section 12, as generally shown in FIG. 8, for attaching the device 10 to any lap-used article. This is desirable in some applications to assist the main lap section 12, and any lap-used article attached thereto or used therewith, to lay flat on the user's lap or leg. In FIG. 8 the hingeable means 28 is shown positioned relatively close to angle 15 and the second portion 14 and between a relatively short main lap section 12 and an auxiliary main lap section 12' which attaches to or is incorporated as an integral part of the lap-used article. It has been found that a conventional piano hinge is very satisfactory for hinge means 28; however, it is obvious that any other common type of hingeable means may also be used as best suits the particular purpose and application. Hingeable means 28 permits the main lap section 12' and any lap-used article attached thereto or incorporated as an integral part thereof to lay flat on the user's lap or leg through a wide latitude of positions without the need to vary or adjust angle 15. This, therefore, permits device 10 to be readily adapted to a wide range of particular uses and users, without any alteration of the basic design of the subject device. This, for example, is advantageous from mass production considerations where it is unknown to what particular lap-used article device 10 will be attached or adapted.

Still a further adaptation of device 10 is incorporated as an integral part of a lapboard 30 as generally shown in FIGS. 9 and 10. Such a lapboard has been found to be especially advantageous for use by any pilot, operator or occupant of any land, sea or air craft to hold and to secure any sheet material, maps, charts, forms, lists, photographs and many other items for observation, reading or writing upon in the most convenient and comfortable position. Device 10 in this particular adaptation is incorporated as an integral part of a generally rectangular sheet or plate which forms the main lapboard section 31. However, device 10 may also be attached to the lapboard by any conventional fastening means instead of being incorporated as an integral portion thereof as desired.

A generally rectangular sheet or plate auxiliary lapboard section 32 is foldably and hingeably attached to the main lapboard section 31 by hingeable means 33. A common piano hinge is very satisfactory for hingeable means can be adapted to serve the same purpose. Device 10, the main lapboard section 31 and auxiliary section 32 and hingeable means 33 may all be fabricated or moulded out of the same type of material as the aforementioned sheet 11; however, it is obvious that many different materials may be used for each of these components as best suits the particular purpose and application.

FIG. 9 illustrates that the auxiliary lapboard section 32 can be folded to position 32' between the user's legs or downwardly so as to be along the side of one of the user's legs. Section 32 can further be folded, doubled or closed either underneath or on top of the main lapboard section 31 as desired. Such flexibility permits the user to use the lapboard for a wide range of uses and in various space situations. The hingeable auxiliary lapboard section 32 is very useful to hold and display auxiliary sheet material, maps, charts, etc. for reference while the main lapboard section 31 is being used to hold and display those items of sheet material, maps, charts, etc. most used or deemed needed in such position for quick reference. This is particularly useful for pilots or operators of air, land and sea craft.

As generally shown in FIGS. 9 and 10 et seq, the main lapboard section 31 is designed to be constructed with a generally triangular portion 34 along the outer edge opposite to the edge attached to the auxiliary lapboard section 32. The purpose of this particular unique design and construction is to permit any sheet material, map, chart or other item to be angularly positioned and held on the main lapboard section 31 surface relative to the user's body, as generally shown by 35 in FIGS. 9 and 10, so that such items are in the most convenient and comfortable position of observation and use. This permits their use or observation without the user having to twist, skew or contort his body or arms in order to optimumly use, observe or read the particular sheet material or item held by the lapboard. This reduces fatigue and promotes safety. It has been found that this triangular portion 34 for use by a pilot, operator or occupant of any vehicle is satisfactory when its outer edge 38 forms or makes an angle of approximately 120 degrees relative to the outer edge 40 (i.e. the edge away from the user) of the main lapboard section 31 and when its inner edge 39 forms or makes an angle of approximately 90 degrees relative to the outer edge 38. However, it is obvious that such angles can be varied as needed or desired to suit the particular application.

All corners of lapboard 30 are rounded for safety reasons and to eliminate any shap corners which could possibly tear or cause excessive wearing of the user's wearing apparel, belt or other items which it may contact.

Spring clip means may be attached to either or both of lapboard sections 31 and 32 to hold the sheet material, maps, charts, etc. These are generally shown as 36 and 37 in FIGS. 9 and 10. Any conventional spring clip means may be used; however, I have found that the box-type with pivoted handle 26, as generally shown in FIGS. 9 and 10 are very satisfactory. The spring clip means 36 is angularly positioned on and secured to the surface of the main lapboard section 31 near the hingeable means 33 so that the sheet or other material held is held relative to the user's body, as generally shown by 35 in FIGS. 9 and 10. This permits the material or items being held to be positioned in the most convenient and comfortable position of use and observation utilizing the triangular portion 34 of the main lapboard section 31. It has been found preferable that an angular position of spring clip means 36 relative to the hingeable means 33 of approximately thirty degrees with the end of the spring clip means 36 nearest the user farther away from the hingeable means 33 than the other end of the spring clip means 36 which is the farthest away from the user, as generally shown in FIGS. 9 and 10. Of course, it is obivous that this angular positioning may be varied as needed, or desired, to suit the particular application.

A spring clip means 37 may be secured to the surface of the auxiliary lapboard section 32, this may be either similarly angularly positioned on the surface of lapboard section 32 as spring clip means 36 is positioned on the surface of the main lapboard section 31 or it may be positioned otherwise as desired along or even with the outer edge of the auxiliary lapboard section 32 which is opposite to the hingeable means 33, as generally shown in FIGS. 9 and 10.

It is further obvious that the dimensions of the main lapboard and auxiliary lapboard section 31 and 32, respectively, may be varied as desired for particular uses and users. In general, however, it has been found that a dimension slightly wider and longer than the largest sheet material or other item to be held is satisfactory. In one application, for example, a dimension of approximately six inches wide by eight inches long is very satisfactory and sufficient for most uses by an aircraft pilot.

A further adaptation of device 10 consists of it being incorporated as a part of a lapboard 30, as generally shown in FIG. 11, by attaching it thereto by a hingeable means 28 in the main lap section 12. Such a hingeable means of attachment permits both the main and auxiliary lapboards 31 and 32 to lie flat on the user's lap or legs through a wide range of user positions without the need to vary angle 15. Any conventional hingeable means is satisfactory for this purpose; however, it has been found that a common piano hinge is very satisfactory for most uses.

Another adaptation of lapboard 30 uses multiple spring clip means attached or secured to the main lapboard 31, as generally shown as 36 and 36' in FIG. 12, to provide an additional means of holding the opposite sides of any sheet material, or other items, held by the lapboard, especially for use in windy conditions. It is obvious that any number of spring clip means can be used to achieve this same purpose, even though only two such spring clip means are shown in FIG. 12 attached to main lapboard 31. It is further obvious that similar multiple spring clip means may be employed on either or both of the lapboard sections 31 and 32, as desired or required. For example, such additional spring clip means on lapboard section 32 is shown by position 37'. It is further obvious that such multiple spring clip means may be positioned relative to the surface of the lapboard in any position as best suits particular uses and users.

A further adaptation of lapboard 30 incorporates a transparent sheet or panel 41 hingeably secured to the auxiliary lapboard 32 by a spring hinge means 42 as generally shown in FIG. 13. This transparent panel 41 may be of any suitable, rigid, transparent material, such as for example, plastic. The use of such a transparent panel permits the sheet material and other items to be held securely and positioned visibly for observation, reading or marking over between the surface of lapboard section 32 and the transparent panel. Panel 41 is generally rectangular and is substantially similar to the surface shape of the auxiliary lapboard 32, which it overlies. In use, the material to be held is inserted and positioned beneath the transparent panel 41 and between it and the top surface of the lapboard. The spring hinge means 42 holds under pressure the transparent panel 41 against the surface of the lapboard and any material inserted therebetween. Any conventional spring loaded hinge means is satisfactory for 42; however, it has been found that a common spring loaded piano hinge performs very satisfactorily. When such transparent panel is attached and held under positive pressure by such a spring hinge means the need of using spring clip means to hold the sheet material or other items is eliminated. This increases the lapboard's flexibility and foldability. It saves space and eases storing.

Still a further adaptation of the subject lapboard incorporates a transparent sheet or panel 43 substantially similar to transparent panel 41 to overlie and substantially equal the shape of the surface of the main lapboard 31, as generally shown in FIG. 14. Panel 43 is attached and secured by hinge means 44 attached to the main lapboard 31, which is substantially similar to and loaded the same as hinge means 42. Transparent panel 43 performs a similar use as panel 41 by permitting sheet material and other items to be held and positioned visibly beneath it and between it and the surface of main lapboard section 31 for observation, reading or marking over.

By properly selecting the material used for panels 41 and 43, erasable marking thereupon may be permitted. This feature is very desirable in many applications, as for example for marking or plotting over maps or charts or forms, etc., especially by navigators, airplane pilots, score keepers, salesmen, etc.

It is preferable that both transparent panels 41 and 43 are attached and held by spring means 42 or 44 along the outermost edges of the lapboard sections 31 and 32. However, it is obvious that these can also be attached and held at any other suitable position. Panel 43, it should be noted, is shown constructed with a generally triangular extension 34' along its outer edge which substantially matches the generally triangular extension 34 of main lapboard 31.

Still another adaptation of lapboard 30 incorporates a contoured leg rest 45 as is generally shown in FIG. 15. This leg rest may be fabricated, formed, shaped or molded in a generally rectangular box-shape from either solid or rectangular hollow tubular material, which has its top side 46 either welded to or attached to or incorporated as an integral part of the underside of the main lapboard section 31. The bottom side 47 of leg rest 45, i.e. the side of leg rest 45 opposite to the top side 46, is formed, shaped, pressed or molded concavely towards the top side 46, so that it is contoured to generally fit and rest upon the top of the user's leg. This provides added support for the lapboard 30, as well as permitting it to be readily positioned for use and preventing it from having objectionable lateral movement. Leg rest 45 may be made either from the same or of a different material as that used for the lapboard 30, whichever best suits the particular application. The dimensions of such a leg rest obviously may be varied to best suit particular uses and users.

FIG. 16 illustrates still another adaptation of lapboard 30 which features a conventional stop-watch 48, or other time piece or instrument, that may either be permanently or detachably attached to the surface of lapboard 30 in some convenient position. FIG. 16 shows one example with 48 positioned in the corner of the main lapboard 31 nearest to the user and hingeable means 33, in the otherwise relatively unused portion of the lapboard section 31. It is obvious, however, that any other convenient position is suitable, e.g. as generally shown by positions 49. It is further obvious that in the event that a transparent panel, either 41 or 43, or both, as previously discussed, is used, then such transparent panel or panels may be either perforated or shaped to admit the use of a stop-watch, time piece or instrument 48 wherever desired. It is further obvious that any number of stop-watches or time pieces or instruments 48 may be simultaneously used as desired.

A satisfactory detachable means for attaching 48 to the surface of the lapboard 30, is common snap means with one snap attached to the case of the stop-watch, time piece or instrument 48 which mates into a mating snap attached to the surface of the lapboard 30. This permits quick attachment or detachment of 48 whenever desired.

Another adaptation of lapboard 30 features and incorporates the use of a detach combination light and pencil sharpener means 50 attached to or clipped onto the lapboard at any desired position to illuminate its surface and any material held thereon, as well as to provide a readily available hand pencil sharpening means, as is generally shown in FIG. 17. An exploded perspective view of the detachable combination light and pencil sharpener means 50 is more particularly shown in FIG. 18.

The combination light and pencil sharpener consists of a generally U-shaped resilient clip means 53, fabricated or molded of any conventionally resilient material for the purpose of attaching the light-pencil sharpener where desired, a generally E-shaped resilient clamp-type guardholder 54 attached to, or incorporated as a part of, clip means 53, a conventional pencil sharpening means 59 attached to either the back of the E-shaped clamp guardholder 54 or on top of the clip means 53 and a light and power source assembly 60, which clamps into the guard-holder 54. The guard-holder is designed and constructed such that its shape conforms to substantially the same general shape of the light and power source means 60.

The light and power source means 60 consists of a housing 55, preferably generally box-shaped with rounded top and bottom corners, which contains all necessary conventional electrical wiring contacts and conventional electric switch 56, which has the switch operating handle protruding through a perforation in, and is attached to, said housing 55 at the end opposite to the side where the light and power source means 60 attaches into housing 55, an artificial electric light 57 consisting of either a fluorescent or incandescent bulb or tube of generally elongated tubular design that has one end roundedly closed and the other end either threaded for screw-in attachment or fitted with some other conventional quick disconnect attachment means for attaching same into and making the appropriate electrical contact in housing 55 with power source 58, and a conventional electric energy power source 58 consisting of a hollow tubular housing with one end roundedly closed and the other end either threaded for screw-in attachment or fitted with some other conventional quick disconnect attachment means for attaching it into and making electrical connection with the appropriate circuitry supplying electric power to the light 57 from conventional batteries housed in said power source 58.

The detachable light and power source means 50 may be constructed of any suitable lightweight material, as for example aluminum or plastic. The light bulb or tube 57 may be of any desired color or specific light design as best suits the particular use. The inside of the guardholder 54 next to the light-power source assembly 60 may be coated or painted with any conventional reflective substance to reflect the light from 57. Also, the guard-holder 54 may be shaped as appropriate to focus the light to any desired area.

Another feature as generally shown in FIG. 17 consists of having a conventional resilient, spring clamp means 51 attached to the back of any of the spring clip means, shown here on 36' for example, and designed to securely hold a conventional pencil 52 inserted therein. This provides the ready availability of a pencil for use as desired.

Another adaptation of lapboard 30 is generally shown in FIG. 19, this provides for the pivotable attachment of lapboard 30 to device 10 so that the main and auxiliary lapboard sections 31 and 32 may be pivoted as desired by the user to any position for convenient observation, reading or writing upon any material held thereon. This adaptation consists of a pivot post 61 of a general bowling-pin shape which is attached or welded at its small diameter end to the underside of the main lapboard 31 so that the enlarged portion remains downwardly exposed for receiving a retainer cap, the main lap section 12 of device 10 being elongated and substantially underlying the main lapboard section 31, the main lap section 12 perforated with a hole approximately located as desired to receive through it the largest portion of pivot post 61 and a pivot post retainer cap 63 which grommetly fits into the said perforation in main lap section 12 and which press fits over and retains pivot post 61 in a position to swivel.

FIG. 20 more particularly shows the cross-sectional perspective view the construction of pivot post retainer cap 63, which consists of a partially through hole 64, that generally matches and snugly fits the bowling-pin shape of pivot post 61, a grommet lip and recess portion 65 which resiliently fits through and around perforation 62 in the main lap section 12 to retain the retainer cap 63 in conventional grommet manner in said perforation, an enlarged portion 66 of any desired dimension so long as it is larger than said perforation 62 and of sufficient thickness to accept the aforesaid pivot post hole 64. This enlarged portion 66 may also function as a leg rest, in which event the underside of the retainer cap 63 may be contoured to rest on the user's leg, shown by 67. This retainer cap may be constructed or molded of any suitable resilient material such as rubber, plastic, Teflon, etc. The pivot post 61 may be constructed of any suitable rigid and durable material, such as steel, aluminum or plastic or other material as best suits the particular use.

It is also possible to construct the retainer cap 63 so that it does not grommetly fit into perforation 62 and instead merely fits over and secures the pivot post 61 to the main lap section 12 swivelly. In this adaptation, perforation 62 is slightly larger than the pivot post 61 so that a loose fit permits the pivot post 61 to swivel in said perforation while still being retained therein by retainer cap 63.

It is obvious that the shape and dimensions of retainer cap 63 may be varied to best suit the particular application.

It is further obvious that the same or similar means of pivotal attachment may be used to attach device 10 directly to any lap-used article. It is also obvious that the pivot post may be secured and retained by any other conventional means besides the aforesaid cap 63 means.

A still further adaptation of device 10 is generally shown in FIG. 21. This provides a tray 68 attached to or incorporated as an integral part of main lap section 12 or device 10. This may be either an ordinary tray or a tray of any special design for a particular purpose. The tray depicted has a raised lip portion 69 around its edges as a means to assist in retaining on the tray items placed thereon. Such a tray is particularly useful for serving food and drinks to any pilot, operator or occupant of any land, sea or air craft.

It is also apparent that the foregoing device and adaptation thereof may be adapted for either right or left hand users without departing from the object and spirit of the invention.

It will also be obvious to one skilled in the art that numerous other variations and adaptations may be made in the invention without departing from the object and spirit of the invention; therefore, the invention is not intended to be limited to or by that illustrated or described herein.

What I claim is:

1. A means for holding and securing lap-used articles in a position of use comprising a generally rectangular rigid main plate of sheet material resting on and substantially parallel to the plane of the user's lap when in its position of use, and one end section of said main plate, which is nearest to the mid-section of the user, substantially parallel to the plane of the user's mid-section, which it lies against when in its position of use, for insertion upwardly and beneath a means for holding said one end section in position, an end portion of said one end section further angularly displaced upwardly and outwardly from said one end section plane and away from the user's mid-section so that said end portion is generally bearing against the top of said means for holding when said one end section is inserted upwardly and beneath said means for holding and another end section of said main plate which remotest from the user's mid-section when in position of use, attached to and holding a lap-used article in position of use.

2. The same structure as claimed in claim No. 1 wherein said means for holding is a safety belt.

3. The same structure as claimed in claim No. 1 wherein said means for holding is a portion of user's wearing apparel.

4. The same structure as claimed in claim No. 1 wherein the width of said one end section is slightly wider than the surface width of said holding means bearing against said one end section.

5. The same structure as claimed in claim No. 1 wherein said end portion of said one end section is slightly wider than the top of said holding means.

6. The same structure as claimed in claim No. 1 wherein said other end section of said main plate is attached to a lap-used article by a hinge means.

7. The same structure as claimed in claim No. 1 with said other end section of said main plate instead incorporated as an integral part of the lap-used article.

8. The same structure as claimed in claim No. 1 wherein said lap-used article is a clipboard.

9. The same structure as claimed in claim No. 1 wherein said lap-used article is a lapboard.

10. The same structure as claimed in claim No. 1 wherein said lap-used article is a navigational plotting board.

11. The same structure as claimed in claim No. 1 wherein said lap-used article is a tray.

12. The same structure as claimed in claim No. 1 wherein said lap-used article is an instrument or a weapon.

13. The same structure as claimed in claim No. 1 wherein said one end section and said end portion of said one end section is narrower than the width of said main plate.

14. The same structure as claimed in claim No. 1 wherein said one end section has snap means attached thereto to attach to mating snaps on user's wearing apparel.

15. The same structure as claimed in claim No. 1 wherein said one end section has a zipper fastening means attached thereto to attach to a mating zipper fastening means on user's wearing apparel.

16. The same structure as claimed in claim No. 1 wherein said one end section has one oblong slot perforated therein near to, parallel to and along each side edge thereof through which said holding means can be inserted and threaded.

17. The same structure as claimed in claim No. 1 with said end portion of said one end section instead doubled back underneath and substantially parallel to said one end section to form a clip means of attachment.

18. The same structure as claimed in claim No. 1 wherein said other end section of said main plate is pivotally attached to said lap-used article by pivot attachment means.

19. A means for holding and securing lap-used articles combined as a part of a lap board comprising a generally rectangular sheet main lapboard, a generally rectangular sheet auxiliary lapboard foldably and hingeably attached to one side of said main lapboard by a hinge means, a generally triangular extension of said main lapboard along the opposite side to and remote from the side attached to said auxiliary board, and a generally rectangular sheet extension of said main lapboard along the side nearest the user when said lapboard is in position of use on the user's lap, with the side adjacent to one end of said hinge means and adjacent to the largest outward projection portion of said triangular extension, with said rectangular extension skewed and angularly positioned relative to the side of said main lapboard that is attached to said hinge means and said auxiliary board, with the end section of said rectangular extension angularly upturned away from the plane of said main lapboard so as to be substantially parallel to the plane of the user's midsection which it lies against when said main lapboard is substantially located in position of use in the plane of the user's lap, for insertion upwardly and beneath a means for holding said end section in position during use, an end portion of said end section further angularly displaced upwardly and outwardly from the plane of said end section and away from the user's mid-section so that said end portion generally bears against the top of said means for holding when said end is inserted upwardly and beneath said means for holding.

20. The same structure as claimed in claim No. 19 wherein said means for holding is a safety belt.

21. The same structure as claimed in claim No. 19 wherein said means for holding is a portion of user's wearing apparel.

22. The same structure as claimed in claim No. 19 wherein the width of said one end section is slightly wider than the surface width, said holding means bearing against said end section.

23. The same structure as claimed in claim No. 19 wherein said end portion of said end section is slightly wider than the top of said holding means.

24. The same structure as claimed in claim No. 19 wherein said rectangular sheet extension is attached to said main lapboard by a hinge means.

25. The same structure as claimed in claim No. 19 wherein said end section and said end portion of said end section is narrower than the width of said main lapboard.

26. The same structure as claimed in claim No. 19 wherein said end section has snap means attached thereto to attach to mating snaps on user's wearing apparel.

27. The same structure as claimed in claim No. 19 wherein said end section has a zipper fastening means attached thereto to attach to a mating zipper fastening means on user's wearing apparel.

28. The same structure as claimed in claim No. 19 wherein said end section has one oblong slot perforated therein near to, parallel to and along each side edge thereof through which said holding means can be inserted and threaded.

29. The same structure as claimed in claim No. 19 with said end portion of said end section instead doubled back underneath and substantially parallel to said end section to form a clip means of attachment.

30. The same structure as claimed in claim No. 19 wherein a spring clip means is attached to the upper surface of said main lapboard for holding sheet material and other items.

31. The same structure as claimed in claim No. 19 wherein at least one spring clip means is attached to both the upper surface of said auxiliary lapboard for holding sheet material and other items.

32. The same structure as claimed in claim No. 19 wherein multiple spring clip means are attached to both the upper surface of said main lapboard and to the upper surface of said auxiliary lapboard for holding sheet material and other items.

33. The same structure as claimed in claim No. 19 wherein a spring clip means is attached to and positioned on said main lapboard upper surface adjacent to and along the side of said main lapboard attached to said auxiliary board with clearance space between, with the end of said spring clip means nearest to said rectangular extension of said main lapboard angularly positioned to be farther away from the side of said main lapboard attached to said auxiliary lapboard than the other end of said spring clip means, so that the sheet material and other items held thereby are angularly positioned relative to the user.

34. The same structure as claimed in claim No. 19 wherein a spring clip means is attached to and positioned on said main lapboard upper surface adjacent to and along the side of said main lapboard attached to said auxiliary lapboard with slight clearance space therebetween with the longitudinal axis of said spring clip means parallel to the side of said triangular extension located on the side of said main lapboard opposite to and remote from where said auxiliary lapboard is attached.

35. The same structure as claimed in claim 19 wherein a transparent sheet panel of substantially the same general shape as said auxiliary lapboard is foldably and hingeably attached to the upper surface of said auxiliary lapboard.

36. The same structure as claimed in claim No. 35 with the said transparent panel foldably and hingeably attached to said auxiliary lapboard by a spring hinge means.

37. The same structure as claimed in claim No. 19 wherein a first transparent sheet panel of substantially the same general shape as said main lapboard is foldably and hingeably attached to the upper surface of said main lapboard and wherein a second transparent sheet panel of substantially the same general shape as said auxiliary lapboard is foldably and hingeably attached to the upper surface of said auxiliary lapboard.

38. The same structure as claimed in claim No. 37 wherein said first and second transparent panels are foldably and hingeably attached with a spring hinge means.

39. The same structure as claimed in claim No. 19 wherein said rectangular extension is separate from and attached to said main lapboard by a hinge means.

40. The same structure as claimed in claim No. 19 wherein said rectangular extension is separate from and attached to said main lapboard by pivot attachment means.

41. The same structure as claimed in claim No. 19 with a leg rest attached to the underside of said main lapboard having the side of said leg rest opposite the side attached to the underside of said main lapboard concavely shaped inwardly along an axis parallel to and to fit the general top contour of user's leg upon which it rests.

42. The same structure as claimed in claim No. 19 wherein at least one time piece means is attached to the surface of said main lapboard.

43. The same structure as claimed in claim No. 10 wherein at least one time piece means is attached to the surface of said auxiliary lapboard.

44. The same structure as claimed in claim No. 31 with a spring clamp pencil holder means attached to the side of one of said spring clip means.

45. The structure as claimed in claim No. 19 with a light source means attached thereto.

46. The same structure as claimed in claim No. 19 wherein the said rectangular extension is severed from said main board and elongated so as to substantially underlie said main board with said elongated portion of said rectangular extension pivotally attached to said main board by pivot attachment means.

47. The same structure as claimed in claim No. 19 with a portable detachable light unit attached to either the main or auxiliary lapboard comprising a generally U-shaped resilient clip of sheet material, a generally E-shaped resilient guard-holder means of sheet material attached to one end of said clip, a hollow housing for receiving the light tube, power source, circuitry and switch means, an oblong cylindrically shaped electric light tube roundedly closed at one end and detachably attached at the other end into a receiving socket in one side of said housing in such a manner that it makes electrical contact with the circuitry supplying electric power thereto from the power source through a switch means, an oblong cylindrically shaped hollow power source cover of sheet material roundedly closed at one end and detachably attached at the other end into a receiving socket in the same said one side of said housing as the said light tube is attached in such a manner as to permit the batteries in said power source to make appropriate electrical contact with the circuitry within said housing so as to supply electrical power to said light tube through said switch means, electric batteries inside said power source cover as an electrical power source, switch means in said housing connected in the circuitry between said power source and said light tube, with the means of operating said switch means protruding through a perforation in the side of said housing opposite to the side of the housing into which said light tube and power source cover are attached and with said housing, switch means, circuitry, batteries, light tube and power source cover as assembled clipped and clamped into said guard-holder.

48. The structure as claimed in claim No. 47 wherein said guard-holder is shaped to match the contour shape of side of the said housing, light tube and power source cover assembled together with said light tube vertically positioned above and over said power source cover.

49. The structure as claimed in claim No. 47 wherein said guard-holder is coated on the side nearest said light tube clamped therein with a reflective substance.

50. The structure as claimed in claim No. 47 wherein said guard-holder is parabolically contoured about said light tube when the light tube is clamped therein to focus the light.

51. The structure as claimed in claimed No. 47 wherein a pencil sharpener means is attached to the back of the side of said guard-holder which is opposite from the side into which said housing, light tube and power source cover clamps.

References Cited
UNITED STATES PATENTS

| | | | |
|---|---|---|---|
| 1,520,085 | 12/1924 | Rossiter | 108—43 X |
| 1,851,600 | 3/1932 | Stanley | 108—43 |
| 2,265,690 | 12/1941 | Fiedler. | |
| 2,701,173 | 2/1955 | Senior et al. | 224—5 X |
| 3,125,825 | 3/1964 | Gaudette | 108—43 X |

HUGO O. SCHULZ, *Primary Examiner.*

R. BALLANTYNE, *Assistant Examiner.*